ID:#UNITED STATES PATENT OFFICE.

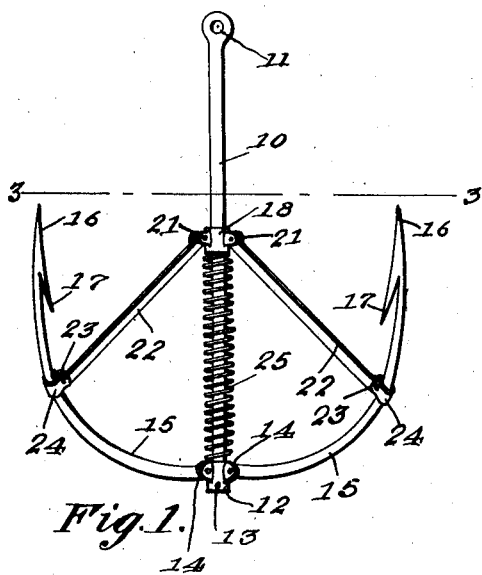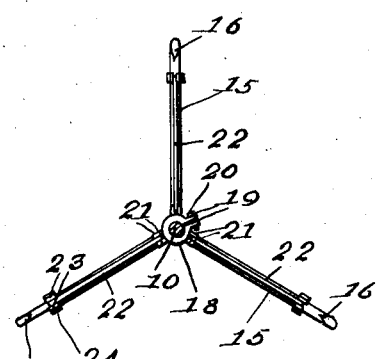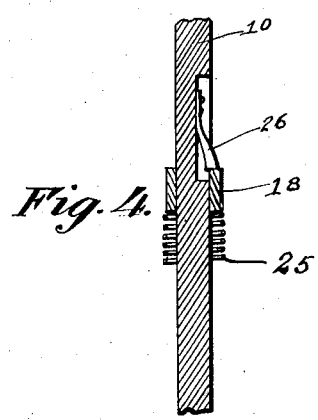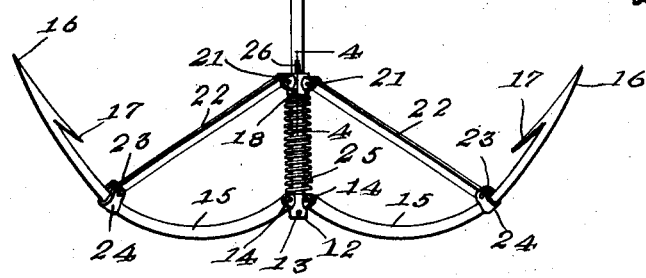

CHARLES F. MURRAY, OF OREGON CITY, OREGON.

FISHHOOK.

1,333,564. Specification of Letters Patent. Patented Mar. 9, 1920.

Application filed September 27, 1919. Serial No. 327,005.

*To all whom it may concern:*

Be it known that I, CHARLES F. MURRAY, a citizen of the United States, residing at Oregon City, in the county of Clackamas and State of Oregon, have invented new and useful Improvements in Fishhooks, of which the following is a specification.

This invention relates to fishing devices, particularly to fish hooks, and has for its object the provision of a fish hook particularly adapted for use in catching the large varieties of game fish, the structure including a plurality of hooks pivoted upon a support and normally held in contracted relation, the arrangement being such that when a fish bites the device, the pull exerted by the fish will cause the hook members to swing outwardly and be held in such position by means of an automatic lock, the purpose of this outward swinging of the hook members being to prop the mouth of the fish open so that the fish will be drowned.

An important object is the provision of a hook of this character which will be automatic in action and which will be very efficient in catching and holding a fish so that danger of loss of the catch will be prevented.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawing in which—

Figure 1 is a side elevation of my device in normal or closed position.

Fig. 2 is a similar view showing the hook member swung to open position,

Fig. 3 is a cross sectional view on the line 3—3 of Fig. 1,

Fig. 4 is a detail cross sectional view on the line 4—4 of Fig. 2, and

Fig. 5 is a detail cross sectional view showing the connection of the braces with the hook members.

Referring more particularly to the drawings, the numeral 10 designates the shank of the device which is provided at one end with an attaching eye 11. Secured upon the other end of this shank is a sleeve member 14 secured in position, as by means of a rivet 13, passing through the sleeve and the shank. Formed on this sleeve are pairs, preferably three in number, of ears 14 between which are pivoted hook members 15 terminating in the usual penetrating points 16 and barbs 17.

Slidable upon the shank 10 is a sleeve 18 which is split and which has its ends formed with ears 19 through which passes a clamping screw 20 whereby the sleeve 18 may be contracted to a greater or less extent to insure properly guided movement upon the shank. Also formed upon the sleeve 18 are pairs, preferably three in number, of spaced ears 21 between which are pivoted links 22 which have their other ends pivoted between ears 23 formed on sleeve members 24 secured upon the hooks 15.

A coil spring 25 surrounds the shank 10 and abuts at one end against the sleeve 18 and at its other end against the sleeve 12 for normally urging the sleeve 18 away from the sleeve 12 for holding the hooks in contracted relation. Secured upon the shank 10 between the sleeve 18 and the sleeve 12, is an umbrella catch 26 which is engageable by the sleeve 18 when the hooks have been moved apart for holding the hooks in such extended position.

In the use of the hook it will be seen that it is attached to the line by means of the attaching eye 11. When a fish bites on the hook the tug of the fish in its endeavors to escape will cause the hooks 15 to swing outwardly, moving the sleeve 18 along the shank 10 against the resistance of the spring 25, the spring serving to cushion the shock besides acting in its ordinary function of holding the hooks in closed position. After the pull of the fish has moved the hooks to extended position, engagement of the sleeve 18 with the catch 26 will hold the hooks in extended position so that the fish cannot chew upon the device as its mouth will be held propped open, and it is also known that the result of this will be to drown the fish.

From the foregoing description and a study of the drawing it will be apparent that I have thus provided a very simple hook structure which will be inexpensive in manufacture, easy to use, and which will efficiently perform all the functions for which it is intended.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention, I claim:—

1. A device of the character described comprising a shank having one end provided with an attaching eye, a supporting member secured upon the other end of said shank, a plurality of hook members pivoted at one end upon said supporting member and having their other ends provided with barbs, a sleeve slidable upon said shank, a plurality of links pivotally connected with said sleeve and with said hook members, a coil spring surrounding said shank and abutting against said supporting member and said sleeve, and an outwardly spring pressed catch on said shank between said sleeve and said supporting member and adapted for engagement by said sleeve for holding said hook members in outwardly extended position.

2. A device of the character described comprising a shank having one end formed with an attaching eye, a plurality of curved hook members pivotally connected with the other end of the shank and terminating in barbs, a sleeve slidable upon said shank, brace members connected with said sleeve and said hook members, a spring normally holding said hook members with their end portions substantially parallel with said shank, and means engaging and holding said sleeve with said spring under pressure when said hook members are moved apart by the biting of a fish thereon.

In testimony whereof I affix my signature.

CHARLES F. MURRAY.